(12) United States Patent
Yutaka et al.

(10) Patent No.: US 6,677,951 B2
(45) Date of Patent: Jan. 13, 2004

(54) ENTERTAINMENT APPARATUS HAVING COMPATIBILITY AND COMPUTER SYSTEM

(75) Inventors: Teiji Yutaka, Kanagawa (JP); Masakazu Suzuoki, Tokyo (JP); Yasuyuki Yamamoto, Kanagawa (JP); Masayoshi Tanaka, Kanagawa (JP); Makoto Furuhashi, Tokyo (JP); Toyoshi Okada, Tokyo (JP); Toru Akazawa, Tokyo (JP)

(73) Assignee: Sony Computer Entertainment, Inc. (JP)

( * ) Notice: Subject to any disclaimer, the term of this patent is extended or adjusted under 35 U.S.C. 154(b) by 199 days.

(21) Appl. No.: 09/798,776

(22) Filed: Mar. 2, 2001

(65) Prior Publication Data

US 2002/0046229 A1 Apr. 18, 2002

(30) Foreign Application Priority Data

Mar. 3, 2000 (JP) .......................... 2000-59350

(51) Int. Cl.$^7$ ................................. B06F 15/16
(52) U.S. Cl. ................ 345/504; 345/502; 345/503; 345/505
(58) Field of Search .................. 345/501, 502, 345/503, 504, 505, 506; 273/148

(56) References Cited

U.S. PATENT DOCUMENTS

| | | | | |
|---|---|---|---|---|
| 5,574,929 A | * | 11/1996 | Pieterse et al. | 712/30 |
| 5,724,527 A | * | 3/1998 | Karnik et al. | 710/315 |
| 5,774,746 A | * | 6/1998 | Kirigaya et al. | 396/49 |
| 5,867,727 A | * | 2/1999 | Hattori | 710/4 |
| 5,930,358 A | * | 7/1999 | Rao | 713/193 |
| 5,949,440 A | * | 9/1999 | Krech et al. | 345/506 |
| 6,030,289 A | * | 2/2000 | Nomi et al. | 463/32 |

FOREIGN PATENT DOCUMENTS

| | | | |
|---|---|---|---|
| JP | 407160351 A | * | 6/1995 |
| JP | 8036485 A | | 2/1996 |
| JP | 10137447 A | | 5/1998 |
| JP | 11-65989 A | | 3/1999 |
| JP | 2000-42249 A | | 2/2000 |

OTHER PUBLICATIONS

Shoking Play Station, vol. 5, No. 10, pp. 135–137, Apr. 9, 1999, Media Works.
Oh! X 1999–Spring, pp. 5–16, May 14, 1999, Softbank Publishing Inc.
Ken Kutaragi, et al., "A microprocessor with a 128b CPU, ... " IEEE ISSCC Digest of Technical Papers, vol. 42 a 256–257 (Feb. 28, 1999).
F. Michael Raam, et al. "A High Bandwidth Superscalar ... " IEEE ISSCC Digest of Technical Papers vol. 42, pp. 258–259 (Feb. 28, 1999).
"ASCII" (Nov. 1, 1999) vol. 23–4 P. 145, 146, 241, 423,424, 432.
"ASCII" (Nov. 1, 1999) vol. 23–11 P. 178–182, 448.
"Bit" vol. 32 No. 1 (Jan. 1, 2000) p. 11–18.

* cited by examiner

Primary Examiner—Matthew C. Bella
Assistant Examiner—Mackly Monestime
(74) Attorney, Agent, or Firm—Lerner, David, Littenberg, Krumholz & Mentlik, LLP

(57) ABSTRACT

An entertainment apparatus is configured to enable a program for an older version of the apparatus to be executed. In a normal mode, a main processing unit (MPU) operates as a main CPU, a graphics processor (GP) operates as a graphics processor, and an input/output subprocessor (IOP) operates as a subprocessor for input and output. In a compatible mode in which a program for an older version of the apparatus is executed, the IOP capable of executing the program for the older version of the apparatus operates as a main CPU, and the MPU and GP emulate a graphics processor for the older version of the apparatus.

5 Claims, 10 Drawing Sheets

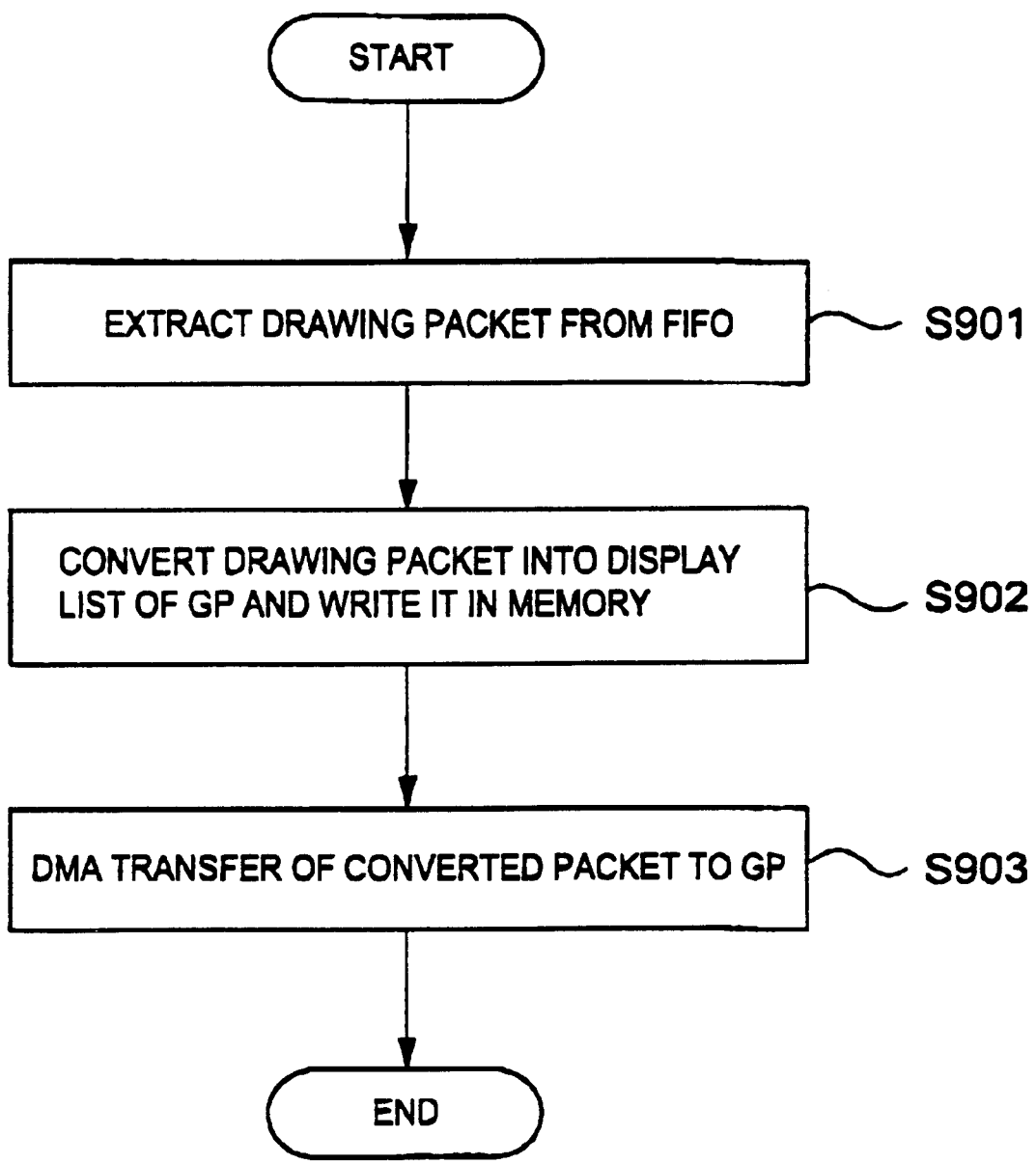

FIG.10A

| Code | B | G | R |
|---|---|---|---|
| Y0 | | X0 | |
| Y1 | | X1 | |
| Y2 | | X2 | |

FIG.10B

| Code | | | | |
|---|---|---|---|---|
| | | B | G | R |
| | Z0 | Y0 | X0 | |
| | Z1 | Y1 | X1 | |
| | Z2 | Y2 | X2 | |

ENTERTAINMENT APPARATUS HAVING COMPATIBILITY AND COMPUTER SYSTEM

This application claims a priority based on Japanese Patent Application No. 2000-59350 filed on Mar. 3, 2000, the entire contents of which are incorporated herein by reference for all purposes.

BACKGROUND OF THE INVENTION

1. Field of the Invention

The present invention relates to an entertainment apparatus for playing a game or the like and, more particularly, to an entertainment apparatus which can be compatible with older versions of the apparatus. The invention also relates to a computer apparatus which can be used with the entertainment apparatus.

2. Description of the Related Art

Video game machines for home use with higher performance have recently been developed and introduced to the market as a result of the advance of semiconductor technologies and so on. In general, such new versions of video game machines have had no compatibility with older versions of the machines even when they had been manufactured by the same manufacturer. That is, a user who bought a new version of a machine could not use a game program for an older version of the machine with the new machine.

It is however desirable to allow a software for an old version of a machine to be executed on a new version of the machine in order not to waste a collection of old softwares (titles).

SUMMARY OF THE INVENTION

It is an object of the invention to provide an entertainment apparatus on which a program for an older version of the apparatus can be executed.

It is another object of the invention to provide a computer system which can be used with an entertainment apparatus as described above.

An entertainment apparatus according to the invention has first processor means and second processor means. The first processor means and the second processor means have a first mode and a second mode as their modes of operation. In the first mode, the first processor means functions as a main CPU and a drawing processor, and the second processor means functions as an I/O processor. In the second mode, the second processor means functions as a main CPU, and the first processor means functions as a drawing processor.

In this case, there are two methods for resetting the second processor means. It may operate as an I/O processor when it is reset using the first resetting method and may operate as a main CPU when it is reset using the second resetting method. Further, first and second clocks may be supplied to the second processor means to allow it to operate in synchronism with the first clock when it is reset using the first resetting method and to operate in synchronism with the second clock when it is reset using the second resetting method.

Further, information reading means for reading information from a portable recording medium may be provided and, in this case, it may be determined whether to activate an operation in the second mode or not depending on the type of the recording medium. For example, such portable recording media include CDs and DVDs.

For example, the first processor means may be constituted of a microprocessor and a graphics processor. In this case, the microprocessor may pass a drawing command supplied by the second processor means to the graphics processor after converting it into a drawing command suitable for the graphics processor on a software basis in the second mode.

A computer system according to the present invention is a computer system which has at least two types of modes of execution. It is characterized in that it is bootstrapped at different frequencies and in different modes of execution depending on the physical characteristics of the recording medium in which the program is recorded. It is also characterized in that it is activated at different frequencies and in different modes of execution depending on an identification signal of the recording medium in which the program is recorded. For example, it is bootstrapped at different frequencies and in different modes of execution depending on whether the recording medium in which the program is recorded is a CD or DVD.

A method for activating a program according to the invention is a method for activating a program of a computer capable of reading programs from plural types of recording media and executing the same, characterized in that a screen associated with the recording media is first displayed when a program is activated.

A method for emulation according to the invention is a method for emulating programs on different systems on a software basis, characterized in that timing parameters for operations are changed depending on serial numbers specific to the programs.

BRIEF DESCRIPTION OF THE DRAWINGS

FIG. 9 is a diagram showing a flow of processes at a GPU emulator.

FIG. 10A illustrates a format of GPU commands associated with polygon drawing commands.

FIG. 10B illustrates a format of GP commands associated with polygon drawing commands.

DETAILED DESCRIPTION OF PREFERRED EMBODIMENT

An embodiment of the invention will now be described in detail with reference to the drawings.

Figure 1:
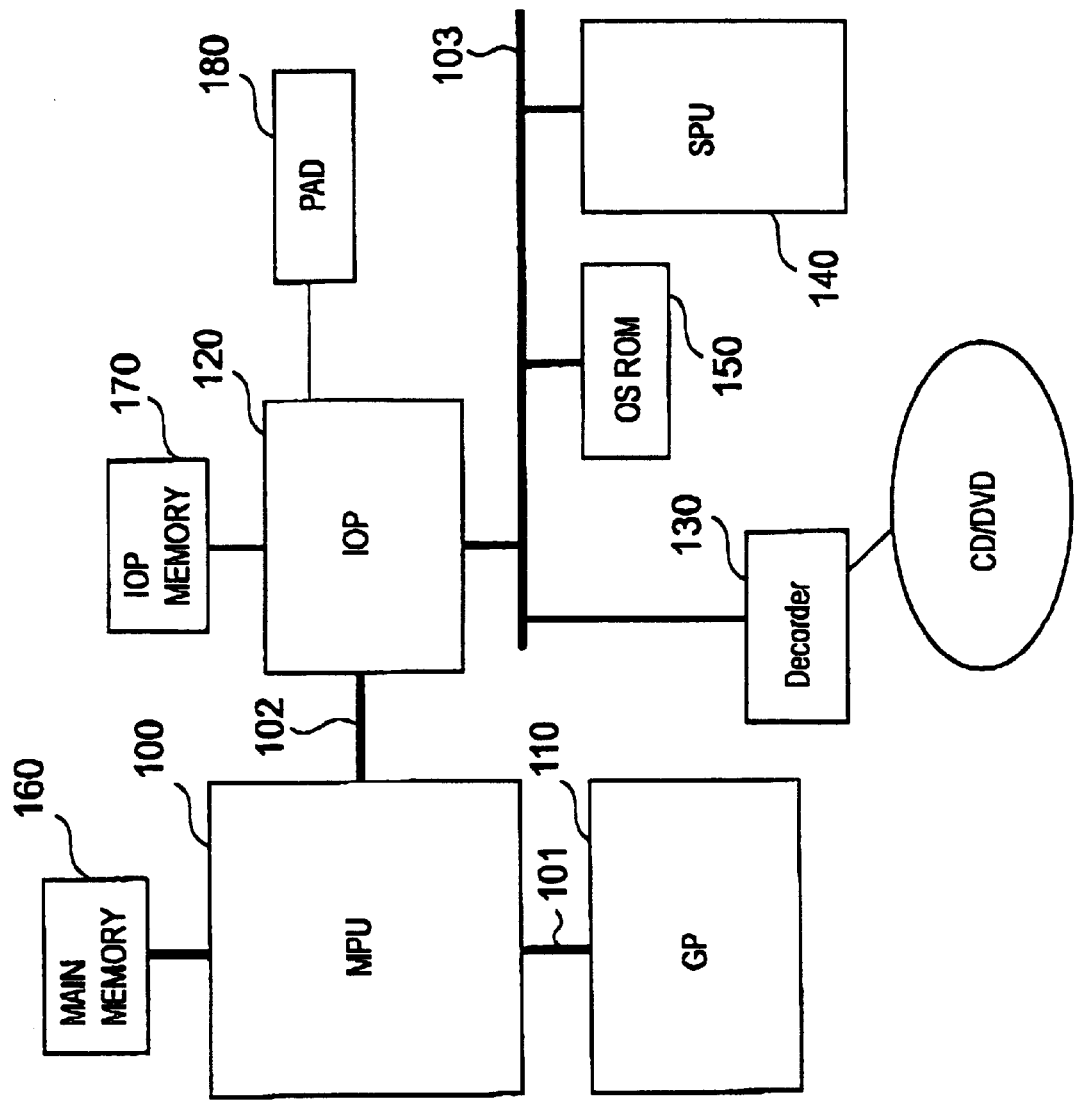
FIG. 1 is a block diagram showing a configuration of an entertainment apparatus according to the invention.

FIG. 1 is a block diagram showing a configuration of an entertainment apparatus according to the invention.

As shown in FIG. 1, the entertainment apparatus has an MPU (main processing unit) 100, a GP (graphics processor) 110, an IOP (input/output subprocessor) 120, a CD/DVD decoder 130, an SPU (sound reproduction processor unit) 140, an OSROM (read only memory) 150, a main memory 160, and an Iop memory 170.

The MPU 100 and GP 110 are connected through a dedicated bus 101. The MPU 100 and IOP 120 are connected through a bus 102 which is referred to as "SBUS". The IOP 120, CD/DVD decoder 130, SPU 140, and OSROM 150 are connected to a bus 103 which is referred to as "SSBUS".

The main memory 160 is connected to the MPU 100, and the IOP memory 170 is connected to the IOP 120. Further, a controller (PAD) 180 is connected to the IOP 120.

The MPU 100 is a main CPU (central processing unit) of the entertainment apparatus. The MPU 100 performs predetermined processes by executing programs stored in the OSROM 150 and by executing programs loaded from a CD or DVD to the main memory 160.

The GP 110 serves a rendering function of the entertainment apparatus. The GP 110 performs a drawing process according to the MPU 100.

The IOP 120 controls transmission of data between the MPU 100 and peripheral apparatuses (the CD/DVD decoder 130, SPU 140 and so on).

The CD/DVD decoder 130 reads data from a CD or DVD and transfers the same to the main memory 160.

The SPU 140 reproduces compressed wave form data stored in a sound buffer (not shown) at a predetermined sampling frequency based on instructions for generation of sound from the MPU 100 or the like.

The OSROM 150 is a ROM in which programs executed by the MPU 100 and IOP 120 at the time of activation or the like are stored. Codes commonly used by the MPU 100 and IOP 120 and codes exclusively used by each processor are separately stored in the OSROM 150. For example, codes (programs) exclusively used by the MPU 100 include a CPU emulator which will be described later.

The main memory 160 is a main memory of the MPU 100, and instructions executed by the MPU 100, data used by the MPU 100 and so on are stored in the same.

The IOP memory 170 is a main memory of the IOP 120. Instructions executed by the IOP 120, data used by the IOP 120 and so on are stored in the IOP memory 170.

The controller (PAD) 180 is an interface for transmitting intentions of a player of a game or the like to the application or the like during the play. The controller 180 has an operating portion. Signals are output when the operating portion is operated by a player.

A configuration of an existing entertainment apparatus will now be described. The existing entertainment apparatus is an apparatus with which an entertainment apparatus having the above-described configuration is to be compatible.

Figure 2:
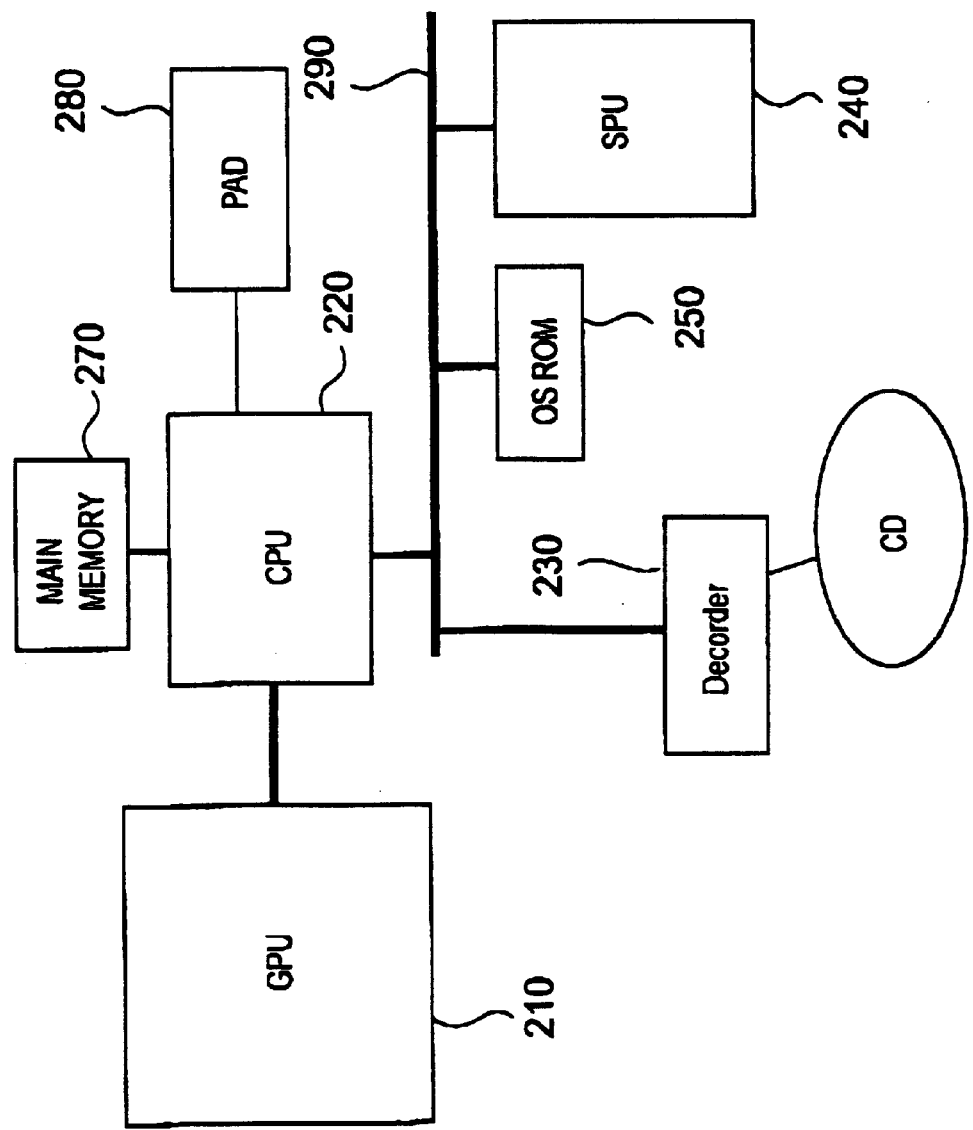
FIG. 2 is a block diagram showing a configuration of an existing entertainment apparatus.

FIG. 2 is a block diagram showing a configuration of the existing entertainment apparatus. As shown in FIG. 2, the existing entertainment apparatus has a CPU (central processing unit) 220, a GPU (graphics processor) 210, a CD-ROM decoder 230, an SPU (sound reproduction processor) 240, an OSROM (read only memory) 250, and a main memory 270.

The GPU 210 and main memory 270 are connected to the CPU 220, respectively. The CPU 220, CD-ROM decoder 230, SPU 240, and OSROM 250 are connected to a bus 290. Further, a controller (PAD) 280 is connected to the CPU 220.

The CPU 220 performs predetermined processes by executing programs stored in the OSROM 250 and programs loaded from a CD into the main memory 270. For example, the operating frequency of the CPU 220 is 33 MHz.

The GPU 210 performs a drawing process in accordance with instructions from the CPU 220. The GPU 210 has a CRTC function for displaying images and a function of drawing polygons in a frame buffer (not shown).

The CD-ROM decoder 230 reads data from a CD and transfers the same to the main memory 270.

The OSROM 250 is a ROM in which programs executed by the CPU 220 at the time of activation are stored.

The main memory 270 is a main memory of the CPU 220, and instructions executed by the CPU 220, data used by the CPU 220 and so on are stored in the same.

The controller (PAD) 280 is an interface for transmitting intentions of a player of a game or the like to the application or the like during the play.

In order to maintain compatibility with the existing entertainment apparatus having the above-described configuration, the present entertainment apparatus has two modes of operation (i.e. a first mode and a second mode). The first mode is a normal mode in which the apparatus normally operates, and the second mode is a compatible mode in which the apparatus operates on the assumption of compatibility between the apparatus and other ones. The present entertainment apparatus is normally activated and operated in the normal mode. However, when a title (software) for the existing entertainment apparatus is executed, the present entertainment apparatus enters the compatible mode.

In the compatible mode, the IOP 120 operates as the CPU 220, and the MPU 100 and GP 110 emulate the GPU 210. Thus, the program for the existing entertainment apparatus is executed.

Specifically, the present entertainment apparatus includes first processor means having an MPU 100 and GP 110 and second processor means having an IOP 120. In the normal mode, the first processor means functions as a main CPU and a drawing processor, and the second processor means functions as an I/O processor. In the compatible mode, the second processor means functions as a main CPU, and the first processor means functions as a drawing processor.

Therefore, the IOP 120 has a processor core that is identical to the CPU 220. Specifically, the IOP 120 can execute program codes prepared for the CPU 220 of the existing entertainment apparatus as they are and operates similarly to the CPU 220. The processor core of the IOP 120 may be any processor core as long as it can execute program codes prepared for the CPU 220 of the existing entertainment apparatus as they are and operates similarly to the CPU 220 (e.g., a binary compatible processor core). In the present embodiment, an identical processor core is used in order to improve backward compatibility with the existing entertainment apparatus.

Further, while the operating frequency of the IOP 120 is 37.5 MHz in the normal mode, for example, it is switched to 33 MHz that is the same frequency as that of the existing entertainment apparatus in the compatible mode. As a result, it can operate with reliability even when operation of the game program is optimized on the level of one clock relative to the hardware of the existing entertainment apparatus. A method for switching the operating frequency will be described later.

The interface between the MPU 100 and IOP 120 is switched depending on the mode of operation. Specifically, in the compatible mode, the IOP 120 interfaces the MPU 100 similarly to the CPU 220, and the MPU 100 interfaces the IOP 120 similarly to the GPU 210. The switching of the interface will be also detailed later.

Further, the operation of the SPU 140 is also switched between the compatible and normal modes. Specifically, it operates completely the same way as the SPU 240 of the existing entertainment apparatus in the compatible mode. It operates as a sound processor with higher performance than that of the SPU 240 in the normal mode. The operating frequency of the SPU 140 is 44.1 KHz that is in accordance with the sampling frequency of a CD-ROM in the compatible mode, and the operating frequency is 48 KHz that is in accordance with the sampling frequency of a DVD in the normal mode.

A method for determining the mode of operation will now be schematically described.

When the power supply of the present entertainment apparatus is turned on, the CD/DVD decoder 130 is activated in the normal mode to determine whether the disk loaded in the CD/DVD drive is intended for the present entertainment apparatus or the existing entertainment apparatus. When it is determined that a CD/DVD disk for the present entertainment apparatus is loaded in the drive or that no disk is loaded, the decoder continues operating in the normal mode. When the disk loaded in the drive is a CD for the existing entertainment apparatus, it enters the compatible mode.

Each component of the present entertainment apparatus will now be described in detail.

An internal configuration of the MPU 100 will first be described in detail.

Figure 3:
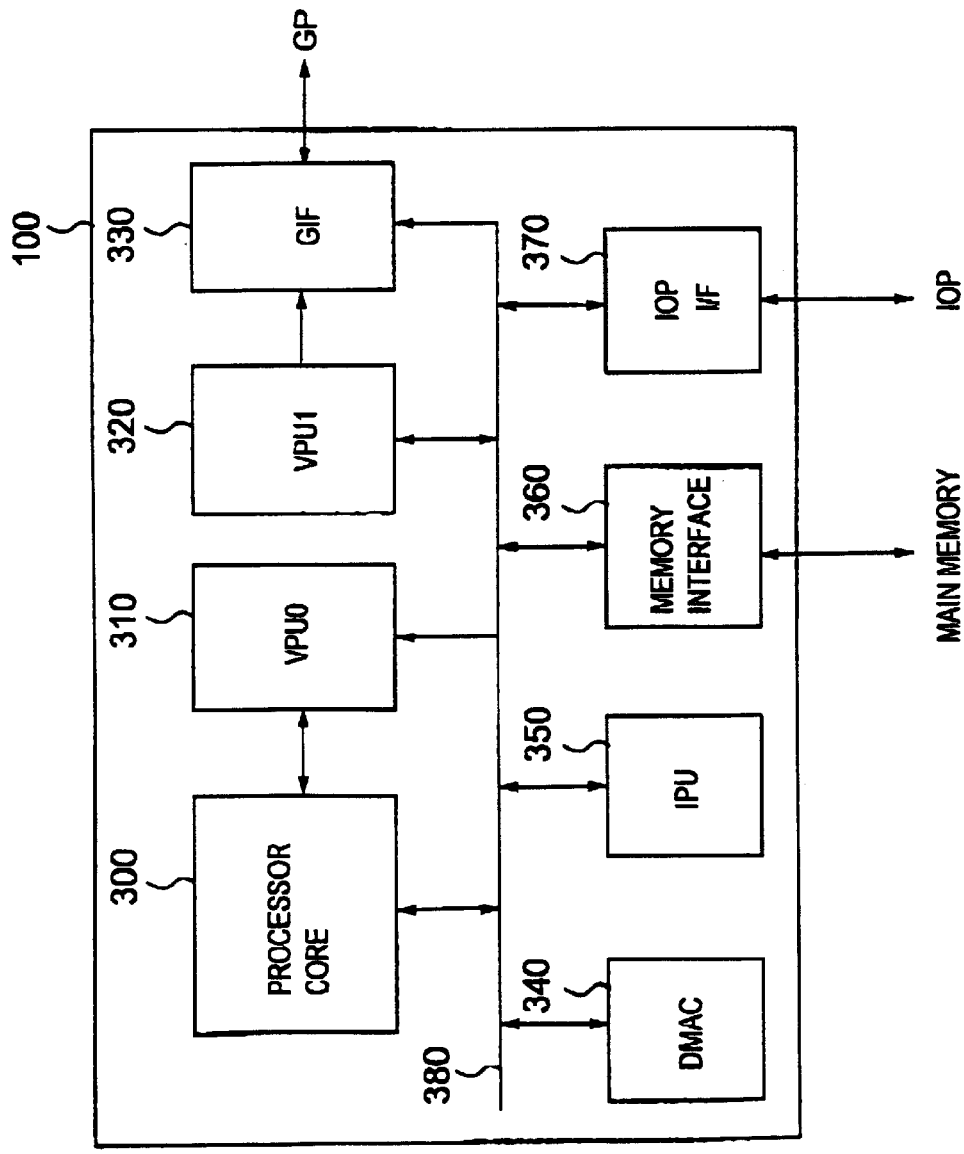
FIG. 3 is a diagram showing an internal configuration of an MPU 100.

FIG. 3 is a diagram showing an internal configuration of the MPU 100. As shown in FIG. 3, the MPU 100 has a processor core 300, a vector processing unit 310 (VPU0), a vector processing unit 320 (VPU1), a GIF (graphical interface unit) 330, a DMA controller (direct memory access controller) 340, an IPU (image data processing unit) 350, a memory interface portion 360, and an IOP interface portion 370. Each of those components is connected to an internal bus 380. The internal bus 380 operates at a frequency that is one half (150 MHz) of the clock frequency (300 MHz) of the processor core 300.

The processor core 300 is a main unit of the MPU 100 which controls other units to perform predetermined processes.

The vector processing units 310 and 320 are processors provided for performing geometric calculations at a high speed. The vector processing unit 310 is directly connected to the processor core 300 to operate as a coprocessor of the processor core 300. The vector processing unit 310 has four floating-point product-sum processing units and one floating-point division processing unit.

The vector processing unit 320 operates as a geometry engine. In addition to a processing unit identical to the vector processing unit 310, there is provided a processing unit for calculating an elementary function (elementary function unit). The vector processing unit 320 is directly connected to the GIF 330.

The GIF 330 exchanges data with the GP 110. A polygon display list generated by the vector processing units 310 and 320 is transferred by the GIF 330 to the GP 110 at 150 MHZ on the dedicated 64-bit bus 101.

DMA controller 340 transfers data between the main memory 160 and the processor core 300, vector processing units 310, 320 and so on according to instructions from the processor core 300.

Primary functions of the IPU 350 are expansion of an MPEG2 (Moving Picture Experts Group Phase 2) bit stream and decoding of micro-blocks.

The memory interface portion 360 is an interface portion for reading data from and writing data to the main memory 160.

The IOP interface portion 370 is an interface portion for exchanging data between the MPU 100 and IOP 120. The IOP interface portion 370 will be detailed later.

An internal configuration of GP 110 will now be described

Figure 4:
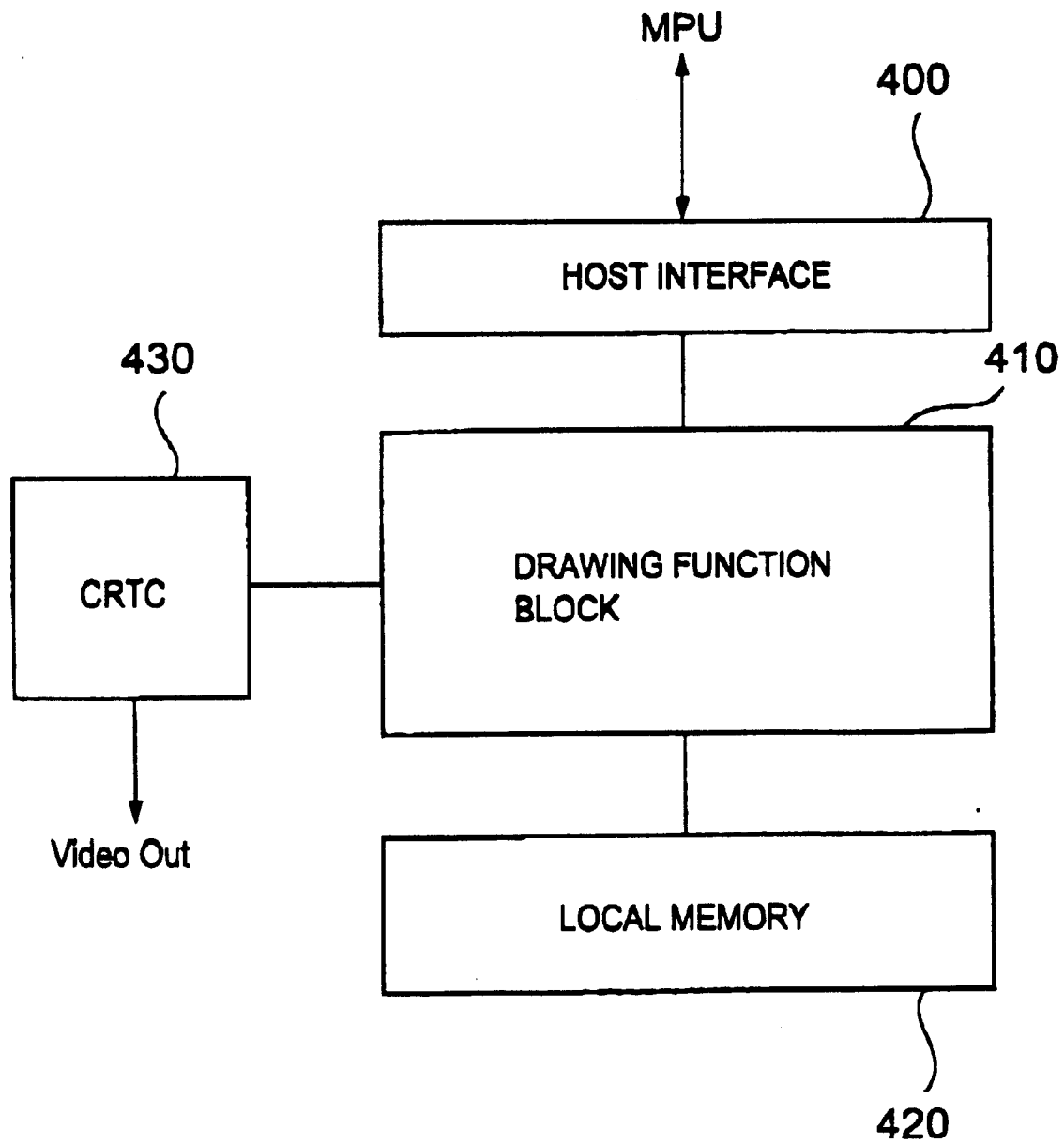
FIG. 4 is a diagram showing an internal configuration of a GP 110.

FIG. 4 is a diagram showing an internal configuration of the GP 110. As shown in FIG. 4, the GP 110 has a host interface portion 400, a drawing function block 410, a local memory 420 and a CRTC (CRT controller) 430.

The host interface portion 400 is an interface portion for transmitting data to and receiving data from the MPU 100.

The drawing function block 410 is a logic circuit portion which performs a rendering process based on instructions from the MPU 100. The drawing function block 410 has 16 digital differential analyzers (DDA) and 16 pixel engines. The drawing function block 410 processes 64 bits of pixel data (32 bits of color information and 32 bits of Z values up to 16 units in parallel. The DDA calculates RGB values, Z values, texture values and so on. The pixel engines generate ultimate pixel data based on such data.

Pixel data generated by the drawing function block 410, texture data transferred by the MPU 100 and so on are stored in the local memory 420.

The CRTC portion 430 outputs the contents of a frame buffer region of the local memory 420 as image signals in accordance with a specified output format (e.g., NTSC, PAL or VESA format).

An internal configuration of the IOP 120 will now be described.

Figure 5:
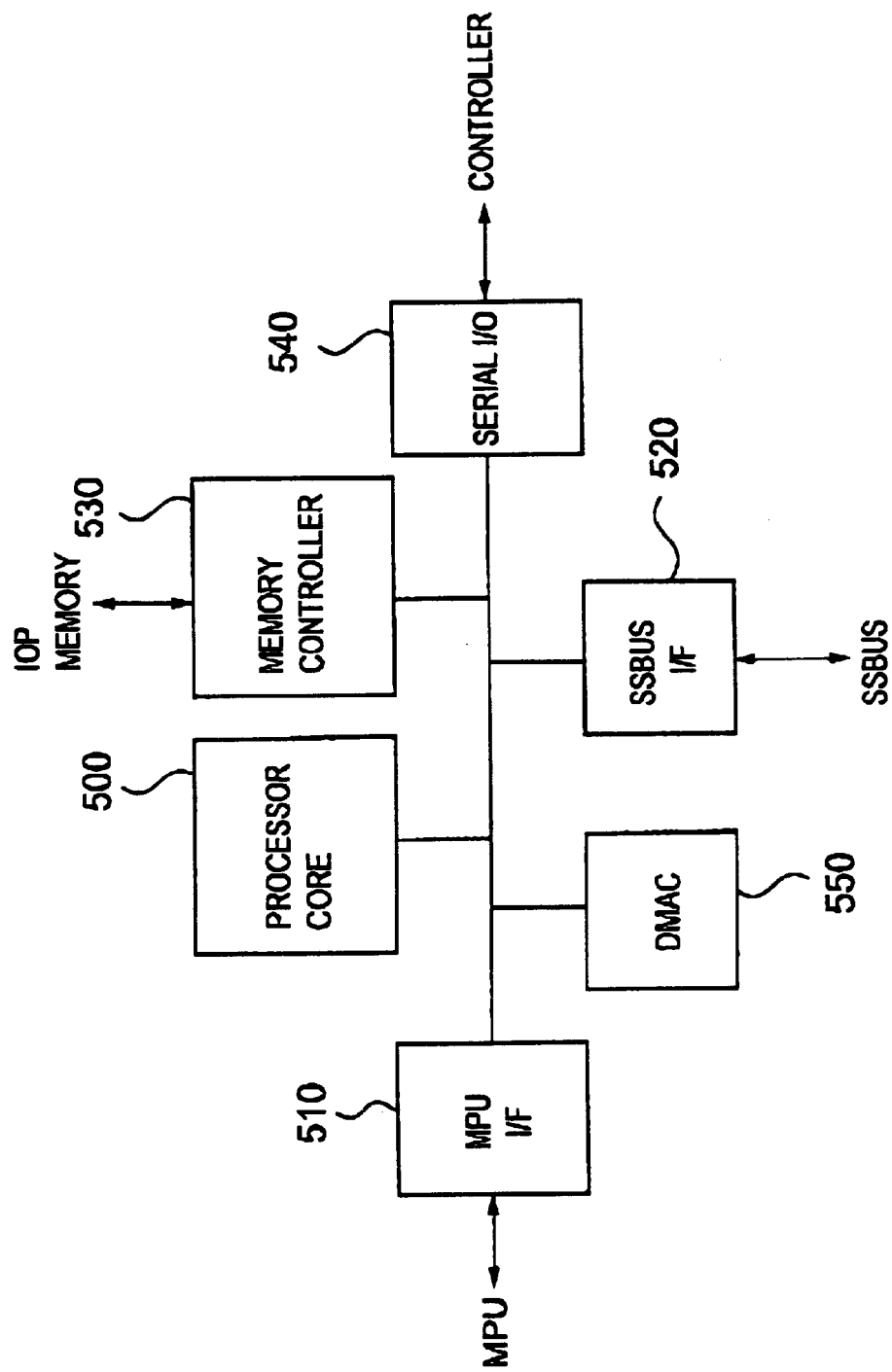
FIG. 5 is a diagram showing an internal configuration of an IOP 120.

FIG. 5 illustrates an internal configuration of the IOP 120. As shown in FIG. 5, the IOP 120 has a processor core 500, an MPU interface portion 510, an SSBUS interface portion 520, a memory controller 530, a serial input/output portion 540 and a DMA controller 550.

The processor core 500 is a control portion for controlling the operation of the IOP 120 as a whole. As previously described, the processor core 500 is identical to the processor core of the CPU 220 of the existing entertainment apparatus.

The MPU interface portion 510 is an interface portion for transmitting data to and receiving data from the MPU 100. The MPU interface portion 510 will be detailed later.

The SSBUS interface portion 520 is an interface portion for transmitting data to and receiving data from the SSBUS 103.

The serial I/O portion 540 is an interface portion for transmitting data to and receiving data from the controller 180 connected to the IOP 120.

The DMA controller 550 exchanges data between the IOP memory 170 and the components of the IOP 120.

The memory controller 530 is a controller for controlling reading of data from and writing of data to the IOP memory 170.

A method for switching from the normal mode to the compatible mode will now be described.

In the present entertainment apparatus, switching from the normal mode to the compatible mode is performed using reset signals (RESET). Therefore, two systems of reset signals (RESET and SRESET) are provided for the present entertainment apparatus.

Figure 6:
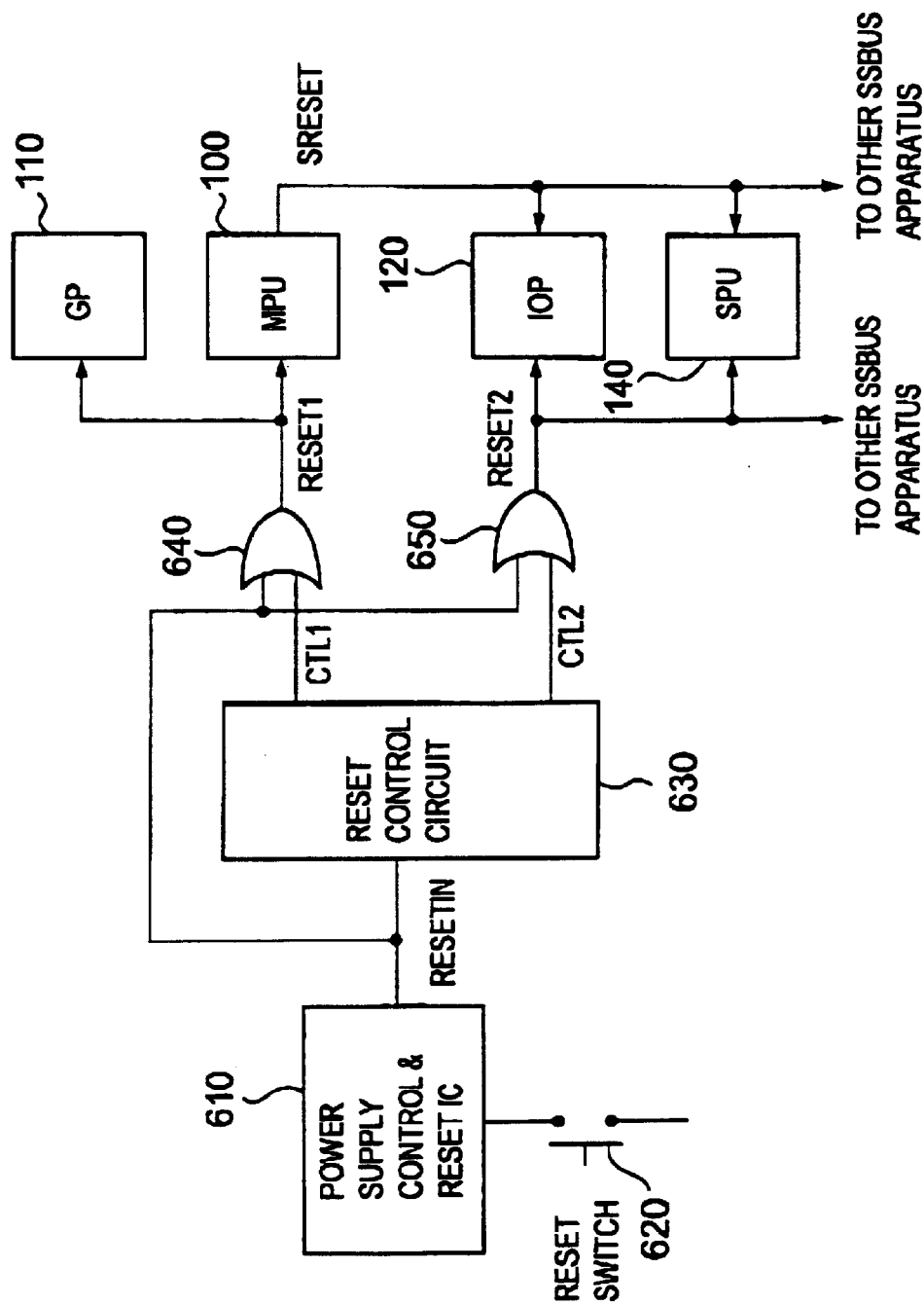
FIG. 6 is a diagram showing a mode of connection of a re set signal.

FIG. 6 illustrates a mode of connection of a reset signal in the present entertainment apparatus.

As shown in FIG. 6, a RESETIN signal output by a power supply control/reset IC 610 is input to a reset control circuit 630 and OR circuits 640 and 650. Control signals (CTL1 and CTL2) output by the reset control circuit 630 are input to the OR circuits 640 and 650. A RESET1 signal output by the OR circuit 640 is input to the MPU 100 and GP 110. A RESET2 signal output by the OR circuit 650 is input to devices on the SSBUS 103 such as the IOP 120 and SPU 140. An SRESET signal output by the MPU 100 is also input to the IOP 120, SPU 140 and so on.

When the power supply is turned on or a reset switch 620 is depressed in the above-described mode of connection, the power supply control reset IC 610 first asserts the RESETIN signal. The power supply control/reset IC 610 negates the RESETIN signal when a predetermined time passes after all power supplies are turned on.

When the RESETIN signal is asserted, the reset control circuit 630 asserts the control signals (CTL1 and CTL2) for the OR circuits 640 and 650. After a predetermined time passes, the RESET signal (RESET2) supplied to the IOP 120 and SPU 140 is negated and, therefore, the control signal (CTL2) for the OR circuit 650 is negated. Thereafter, since the RESET signal (RESET1) supplied to the MPU100 and GP 110 is negated, the control signal (CTL1) for the OR circuit 640 is negated. The timing for canceling RESET signals is thus shifted between the MPU 100 and so on and the IOP 120 and so on in order to cause the MPU 100 and GP 110 to start operating after the IOP 120 starts operating with a certain level of reliability.

The MPU 100, IOP 120, SPU 140, etc. reset by the RESET signals (RESET1 and RESET2) first start operating in the normal mode.

After a required initializing process is finished, the MPU 100 asserts the SRESET signal when the compatible mode is to be entered as a result of the above-described determination of the mode of operation. Each of the IOP 120, SPU 140 and so on reset by the SRESET signal starts operating in the compatible mode.

As described above, the switching of the operating frequencies of the IOP 120 and so on also takes place when entered to the compatible mode. The switching of the operating frequencies will now be described.

Figure 7:
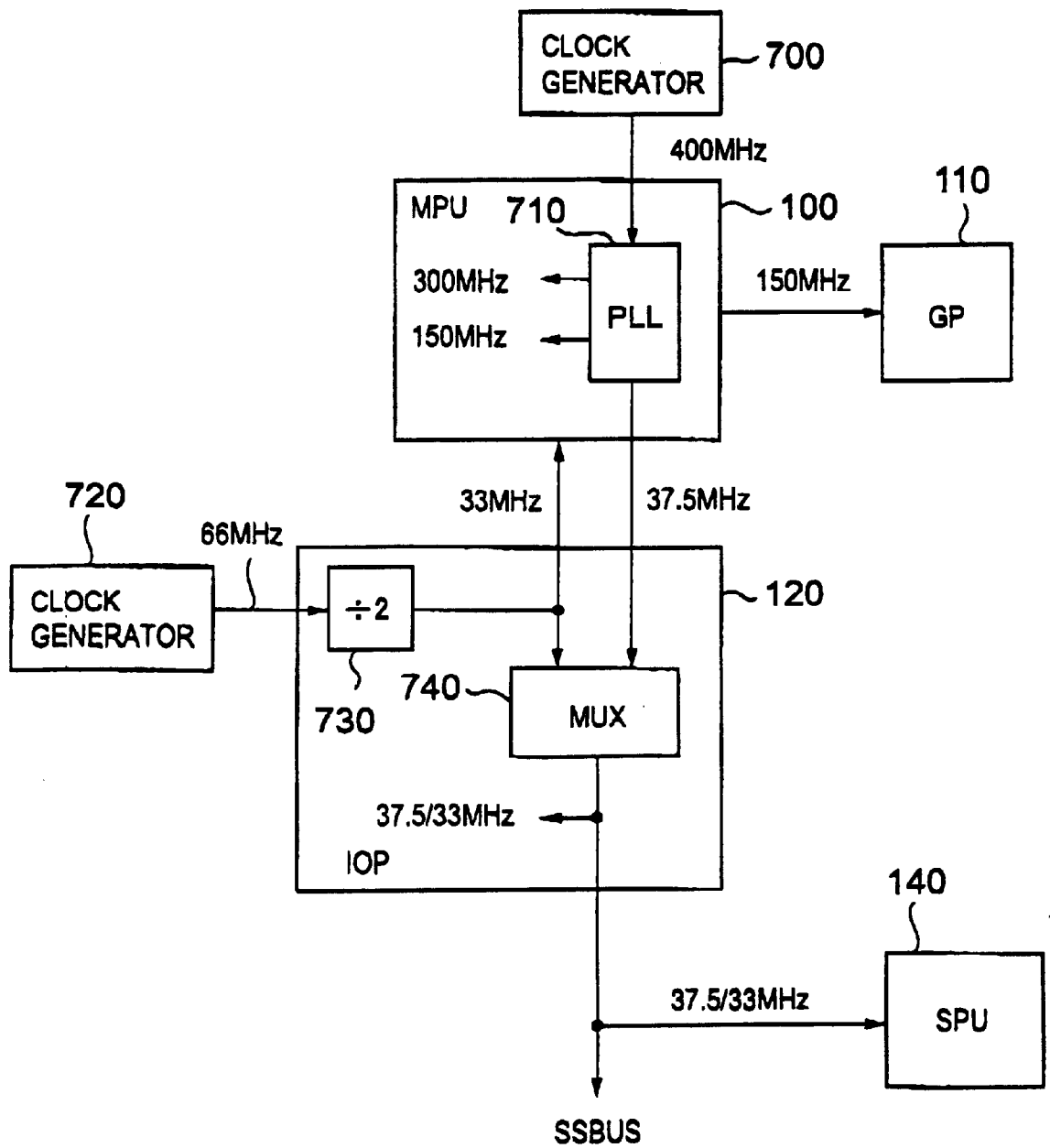
FIG. 7 is a diagram showing a mode of connection of a clock signal.

FIG. 7 illustrates a mode of connection of a clock signal in the present entertainment apparatus.

As shown in FIG. 7, a clock of 400 MHz generated by a clock generator 700 is supplied to the MPU 100. The MPU 100 converts the clock into clocks of 300 MHz, 150 MHz and 37.5 MHz with an internal PLL (Phase-Locked Loop) circuit 710.

The MPU 100 uses the 300 MHz clock as an operation reference clock of the processor core 300 and uses the 150 MHz clock as a bus clock of the internal bus 380. The 150 MHz clock is also used as a reference clock for data transfer to the GP 110. The MPU 100 supplies the 37.5 MHz clock to the IOP 120 as an operation reference clock in the normal mode.

A clock of 66 MHz generated by a clock generator 720 is also supplied to the IOP 120. The IOP 120 converts the clock into a clock of 33 MHz with an internal frequency conversion circuit 730. It supplies the 33 MHz clock to a multiplexer (MUX) 740 and supplies the same to the MPU 100, as a communication synchronization clock for communication with the MPU 100 in the compatible mode. The MPU 100 uses the 33 MHz clock (PGCLK) for communication with the IOP 120 in the compatible mode.

The multiplexer 740 is provided for selecting an operation reference clock for the IOP 120, and the 37.5 MHz clock supplied by the MPU 100 and the 33 MHz clock output by the frequency conversion circuit 730 are input to the same. When the IOP 120 is reset by the RESET signal (RESET2), the multiplexer 740 selects and outputs the 37.5 MHz clock as a reference clock. When the IOP 120 is reset by the SRESET signal, it selects and outputs the 33 MHz clock as a reference clock.

The IOP 120 operates in synchronization with the reference clock output by the multiplexer 740. The reference clock output by the multiplexer 740 is also supplied to the devices on the SSBUS (SPU 140 and so on).

Therefore, the reference clock of the IOP 120. SPU 140 and so on is 37.5 MHz when they are reset by the RESET signal and it is 33 MHz (the same frequency as that of the existing entertainment apparatus) when they are reset by the SRESET signal.

As described above, the transfer to the compatible mode is accompanied by switching of the interface between the MPU 100 and IOP 120. The switching of the interface will now be described.

Figure 8:
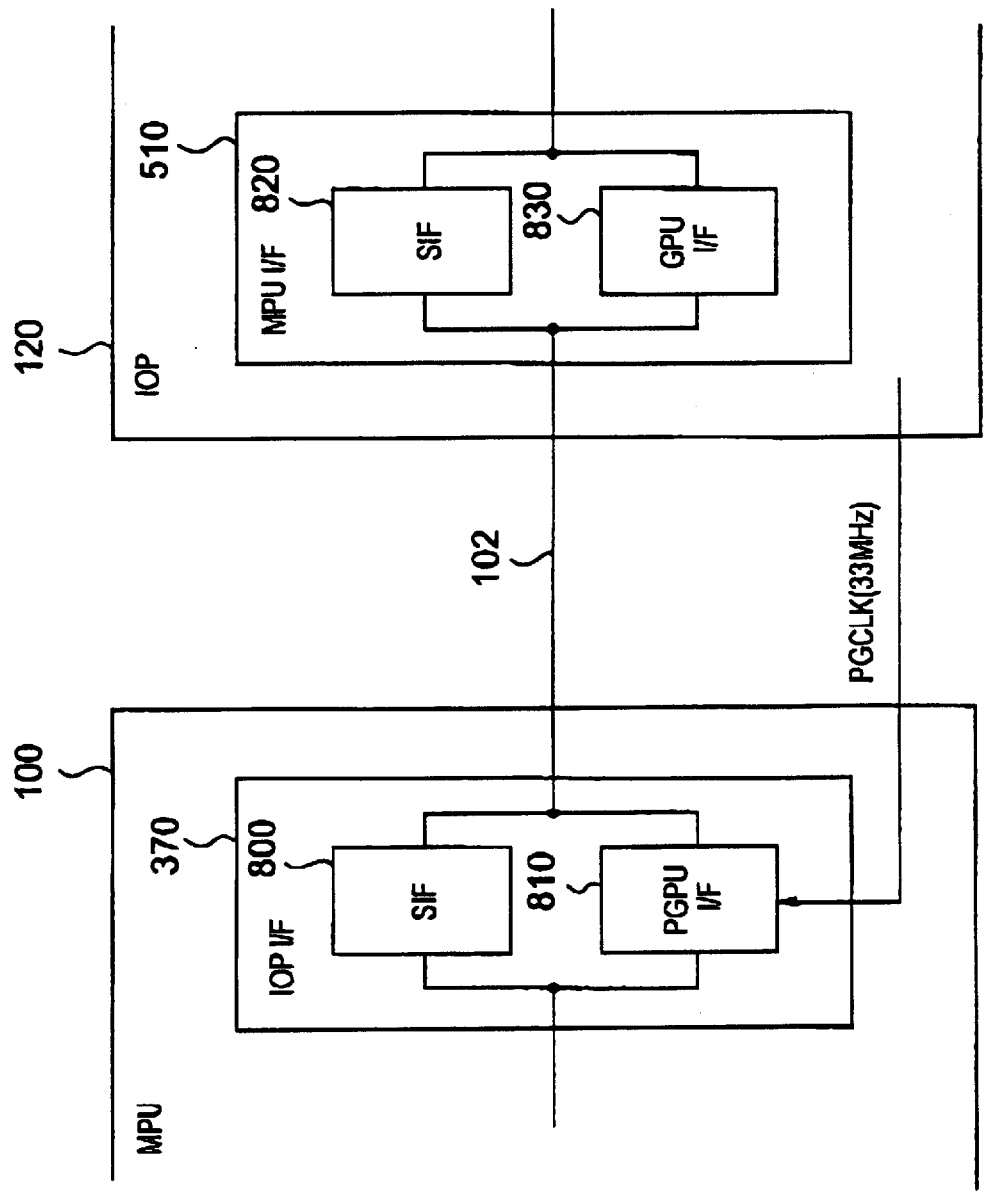
FIG. 8 is a diagram showing an internal configuration of an IOP interface portion 370 and an MPU interface portion 510.

FIG. 8 is a diagram showing internal configurations of the IOP interface portion 370 in the MPU 100 and the MPU interface portion 510 in the IOP 120.

As shown in FIG. 8, the IOP interface portion 370 has an SIF (SBUS interface) portion 800 and a PGPU interface (pseudo GPU interface) portion 810. The MPU interface portion 510 has an SIF (SBUS interface) portion 820 and a GPU interface portion 830.

The SIF portion 800 is a block of the MPU 100 for providing an SBUS interface in the normal mode. The PGPU interface portion 810 is a block of the MPU 100 for providing a pseudo-interface that is identical to that of the GPU 210 of the existing entertainment apparatus in the compatible mode. Each of the SIF portion 800 and PGPU interface portion 810 has an FIFO buffer for storing transferred data and registers used for purposes including transfer control and so on.

The SIF portion 820 is a block of the IOP 120 for providing an SBUS interface in the normal mode. The GPU interface portion 830 is a block of the IOP 120 for providing a GPU interface that is similar to that of the CPU 220 of the existing entertainment apparatus in the compatible mode.

The IOP interface portion 370 operates in synchronization with the bus clock (150 MHz) of the internal bus 380. The MPU interface portion 510 operates in synchronization with the operating frequency of the IOP 120. Specifically, it operates in synchronization with the 37.5 (=150/4) MHz clock in the normal mode and operates in synchronization with the 33 MHz clock in the compatible mode. Therefore, the MPU 100 and IOP 120 are in synchronous communication in the normal mode and are in asynchronous communication in the compatible mode. The PGPU interface portion 810 includes a logic for absorbing the asynchronous communication in the compatible mode, and the PGCLK (33 MHz) supplied by the IOP 120 is input to the same.

In such a configuration, in the normal mode, the MPU 100 uses the SIF portion 800 as an interface to the IOP 120, and the IOP 120 uses the SIF portion 820 as an interface to the MPU 100. In the compatible mode, the MPU 100 uses the PGPU interface portion 810, and the IOP 120 uses the GPU interface portion 830.

Switching between the SIF portion 800 and the PGPU Interface portion 810 of the MPU 100 is carried out on a software basis. Specifically, the SIP portion 800 is selected when the MPU 100 is reset, and switching to the PGPU interface portion 810 takes place when certain control registers in the MPU 100 are thereafter written by a program executed by the processor core 300 of the MPU 100.

Switching between the SIF portion 820 and the GPU interface portion 830 of the IOP 120 is carried out on a hardware basis when the IOP 120 is reset. Specifically, SIF portion 820 is selected when the IOP 120 is reset by the RESET signal (RESET2), and the GPU interface portion 830 is selected when it is reset by the SRESET signal.

A bootstrapping sequence of the present entertainment apparatus will now be described.

When reset by the RESET signals (RESET1 and RESET2), the MPU 100 and IOP 120 first start executing a program at the same boot vector address. In the present embodiment, since it is assumed that the MPU 100 and IOP 120 are processors having the same architecture, they have the same boot vector address.

At this time, the IOP 120 directly accesses the OSROM 150 The MPU 100 accesses the OSROM 150 through the IOP 120. The IOP 120 leaves the MPU 100 in a standby state without granting the right for using the bus until a required initializing process is completed in order to initialize itself first.

In the region of the OSROM 150 which is accessed by the MPU 100 and IOP 120 at the time when they are reset, a code is stored for allowing them to acquire a processor ID from which they identify themselves as the MPU 100 or IOP 120 and allowing them to jump to codes for the respective processors. Each of the IOP 120 and MPU 100 jumps to the code for itself by executing the same code.

When the IOP 120 jumps to the code for itself, it determines which of the RESET signal or SRESET signal has caused the current reset. The IOP 120 can determine which of the RESET signal or SRESET signal has caused the current reset by referring to the bits of a particular control register.

In this case, since the reset has been caused by the RESET signal, the hardware is initialized in adaptation to the present entertainment apparatus in order to activate the present entertainment apparatus. Then, drivers for the peripherals (the controllers, CD/DVD drive and so on) are set up.

When the required initializing process is finished, the IOP 120 causes the MPU 100 which has been in the standby state to start operating (MPU is turned on), and the IOP 120 itself waits for a request from the MPU 100. The MPU is turned on when the IOP 120 rewrites the bits in the particular control register.

When the MPU 100 is permitted to access the OSROM 150 by the IOP 120 which has completed the process of initializing itself (when the MPU is turned on), the MPU 100 reads the OSROM 150 and starts executing the program which it has read. In this program, the MPU 100 acquires a processor ID for itself similarly to the IOP 120 and jumps to a code for itself (i.e., a code for the MPU 100).

When the MPU 100 jumps to the code for itself, it displays an opening screen which is common to the existing entertainment apparatus and the present entertainment apparatus.

Then, the type of the disk loaded in the CD/DVD drive is determined. The determination is made by referring to a disk type register in the CD/DVD decoder 130.

When the CD/DVD decoder 130 has been reset by the RESET signal (RESET2), it has identified the disk loaded in the drive, reflected the result (indicating that the disk is for the present entertainment apparatus, that the disk is for the existing entertainment apparatus or that no disk is loaded, for example) in the disk identification register in the CD/DVD decoder 130 and entered the common waiting state.

When the determination of the disk type indicates that a disk for the present entertainment apparatus is loaded or that no disk is loaded, the present entertainment apparatus is activated, and a logo of the present entertainment apparatus is displayed.

Further, when a disk for the present entertainment apparatus is loaded in the drive, the MPU 100 loads a program for the present entertainment apparatus from the disk into the main memory 160 to execute the same. When a drawing process is performed during the execution of the program, it instructs the GP 110 to perform drawing and instructs the SPU 140 to output sounds through the IOP 120 when sounds are to be output.

When the determination of the disk type indicates that a disk for the existing entertainment apparatus is loaded in the drive, switching to the compatible mode takes place, and the apparatus is activated as the existing entertainment apparatus.

Therefore, the MPU 100 loads a GPU emulator from the OSROM 150 into the main memory 160 and executes the same.

The GPU emulator executed by the MPU 100 first acquires a title number from the disk then sets a parameter for the GPU emulator in accordance with the title number. The parameter is used to adjust the drawing time according to the title. For example, it is used to set the number of WAITs depending on the number of drawing primitives.

Then, the interface to the IOP 120 is switched from the SIF portion 800 to the PGPU interface portion 810. As described above, the switching is performed by writing a certain value in a certain control register.

Next, the SRESET signal is asserted to cause the IOP 120 and so on to enter the compatible mode. As described abode, the SRESET signal can be asserted by writing a certain control register. When the SRESET signal is asserted, the MPU 100 enters a state of waiting for a graphics command from the IOP 120. The combination of the MPU 100 and GP 110 thereafter operates as the GPU 210.

When the IOP 120 is reset by the SRESET signal, it jumps to a code for the IOP 120 in the same way as in the case of a reset caused by the RESET signal and determines which of the RESET signal or SRESET signal has caused the current reset.

In this case, since the reset has been caused by the SRESET signal, the IOP 120 initializes the hardware in adaptation to the existing entertainment apparatus to activate the present entertainment apparatus as the existing entertainment apparatus. The SPU 140 which has been reset by the SRESET signal is activated in the compatible mode similarly to the IOP 120. When the SRESET signal is asserted, an interrupt to the CD/DVD decoder 130 occurs, and the CD/DVD decoder 130 starts operating in the compatible mode and enters a state of waiting for a command upon detection of the interrupt.

When a required initializing process is finished, the IOP 120 starts operating as a main CPU similarly to the CPU 220 of the existing entertainment apparatus, displays a logo of the existing entertainment apparatus and bootstraps compatible kernels. Thereafter, the IOP 120 executes a program for the existing entertainment apparatus similarly to the CPU 220 of the existing entertainment apparatus. During the execution of the program, the IOP 120 instructs the MPU 100 to perform drawing by transmitting a GPU command when graphics are to be drawn and instructs the SPU 140 in the compatible mode to output sounds when sounds are to be output.

A detailed description will now be made on the operation of the GPU emulator in the compatible mode. The GPU emulator converts the format of the GPU command transmitted from the IOP 120 to the MPU 100 into a format of a GP command such that it can be executed by the GP 110.

FIG. 9 is a diagram showing a flow of processes of the GPU emulator. When a drawing packet in the GPU format is written in the FIFO In the PGPU interface portion 810, an interrupt to the MPU 100 takes place.

Upon receipt of the interrupt, the GPU emulator extracts the drawing packet in the GPU format from the FIFO of the PGPU interface portion 810 (S901). The extracted drawing packet in the GPU format is converted into a drawing packet in the GP format and is written in the main memory 160 (S902). Then, the DMA controller 340 performs DMA transfer of the converted drawing packet in the GP format to the GP 110 through the GIF 330 (S903).

A specific example of the conversion of the format of a drawing command will now be described. A description will now be made here on the conversion of the format of a command to draw a triangular polygon.

FIGS. 10A and 10B show formats of polygon drawing commands. FIG. 10A shows a format of a GPU command, and FIG. 10B shows a format of a GP command. The GPU command has 32 bits per word, and the GP command has 64 bits per word.

In FIGS. 10A and 10B, "code" represents a code for identifying a type of drawing, and "B", "G", and "R" represent color information. "X" and "Y" represent coordinate information, and "Z" represents depth information. Since the GP 110 employs the Z-buffer method, priorities can be controlled regardless of the order of drawing. The GPU command includes no depth information because it does not employ the Z-buffer method. Therefore, the GPU emulator uses the same predetermined value as "Z" during the conversion into the GP format.

When the MPU 100 receives a GPU packet as shown in FIG. 10A from the IOP 120, it interprets the first one word to determine the type of the command and to interpret the subsequent data. It rearranges the interpreted data and converts the accuracy of the RGB and XY to generate a GP command packet as shown in FIG. 10B, which is then transferred to the GP 110.

Finally, a description will now be made on changes of the screen at the time of activation of the present entertainment apparatus.

First, when the power supply of the present entertainment apparatus is turned on, the MPU 100 reproduces opening animation and sounds. Thereafter, the screen blacks out, and the sounds fade out.

When the disk loaded in the drive is a disk for the existing entertainment apparatus, switching to the compatible mode takes place. The IOP 120 displays a mark of the existing entertainment apparatus with a black background in the same way as the existing entertainment apparatus and reproduces sound effects for the existing entertainment apparatus. When the disk loaded in the drive is a disk for the present entertainment apparatus, the normal mode is maintained, and the MPU 100 displays a mark of the present entertainment apparatus with a black background and reproduces sound effects for the present entertainment apparatus. By causing the screen to black out, prior to switching of the operation mode as thus described, the mark of the existing entertainment apparatus with a black background smoothly continues to the black-out at the time of activation, which allows smooth switching to the compatible mode.

While the present invention relates to an entertainment apparatus, it may be regarded as a computer system from the viewpoint of its structure and capability. Therefore, the scope of the application of the invention is not limited to entertainment. It is however desirable to use the present invention such that the capability of processing graphics and sounds higher than common computers characteristic of the invention will be demonstrated.

Further, the present invention is not limited to the embodiments described above. For example, it includes an embodiment wherein the second processor means functions as the main CPU and drawing processor, and the first processor means functions as the I/O processor in the first mode; the first processor means functions as the main CPU, and the second processor means functions as the drawing processor in the second mode.

As described above, the present invention makes it possible to provide an entertainment apparatus having compatibility with older versions of the apparatus.

What is claimed is:

1. An entertainment apparatus, comprising:

a first processor means having first and second modes of operation, said first processor means functioning as a main CPU and a drawing processor in said first mode of operation and functioning as a drawing processor in said second mode of operation; and a second processor means having first and second modes of operation, said second processor means functioning as an I/O processor in said first mode of operation and functioning as a main CPU in said second mode of operation;

wherein said first processor means includes a microprocessor and a graphics processor, said microprocessor converting a drawing command from said second processor means into a converted drawing command for said graphics processor on a software basis and sending said converted drawing command to said graphics processor in said second mode.

2. An entertainment apparatus according to claim 1, wherein said second processor means operates as an I/O processor when reset by a first resetting method and operates as a main CPU when reset by a second resetting method different from said first resetting method.

3. An entertainment apparatus according to claim 2, further comprising:

first and second clocks, wherein said second processor means operates in synchronization with said first clock when reset by said first resetting method and operates in synchronization with said second clock when reset by said second resetting method.

4. An entertainment apparatus according to claim 1, further comprising information reading means for reading information from a portable recording medium, wherein said first and second processor means operate in said second mode when said recording medium is of a selected type.

5. An entertainment apparatus according to any one of claims 2, 3, 4 and 1, wherein the entertainment apparatus operates in a normal manner in said first mode, and operates based on an assumption of compatibility between the entertainment apparatus and other devices in said second mode.

* * * * *

UNITED STATES PATENT AND TRADEMARK OFFICE
CERTIFICATE OF CORRECTION

PATENT NO. : 6,677,951 B2
DATED : January 13, 2004
INVENTOR(S) : Teiji Yutaka and Masakazu Suzuoki It is certified that error appears in the above-identified patent and that said Letters Patent is hereby corrected as shown below:

Column 2,
Line 43, insert -- - -- after "re".

Column 3,
Line 3, "lop" should read -- IOP --.
Line 26, "wave form" should read -- waveform --.
Line 36, "CPU" should read -- GPU --.

Column 6,
Line 23, "values" should read -- value) --.

Column 10,
Line 41, "abode" should read -- above --.

Column 11,
Line 67, delete "," after "out".

Signed and Sealed this

Fifteenth Day of June, 2004

JON W. DUDAS
*Acting Director of the United States Patent and Trademark Office*